(12) United States Patent
Wartmann

(10) Patent No.: US 11,520,131 B2
(45) Date of Patent: Dec. 6, 2022

(54) OBJECTIVE FOR A MICROSCOPE

(71) Applicant: Carl Zeiss SMT GmbH, Oberkochen (DE)

(72) Inventor: Rolf Wartmann, Waake (DE)

(73) Assignee: Carl Zeiss Microscopy GmbH, Jena (DE)

(*) Notice: Subject to any disclaimer, the term of this patent is extended or adjusted under 35 U.S.C. 154(b) by 378 days.

(21) Appl. No.: 16/829,393

(22) Filed: Mar. 25, 2020

(65) Prior Publication Data

US 2020/0310093 A1    Oct. 1, 2020

(30) Foreign Application Priority Data

Mar. 27, 2019   (DE) .......................... 102019204285.6

(51) Int. Cl.
*G02B 21/00* (2006.01)
*G02B 3/00* (2006.01)
*G02B 21/02* (2006.01)

(52) U.S. Cl.
CPC ........... *G02B 21/006* (2013.01); *G02B 3/005* (2013.01); *G02B 21/025* (2013.01)

(58) Field of Classification Search
CPC .... G02B 21/006; G02B 3/005; G02B 21/025; G02B 7/105; G02B 21/02; G02B 21/33; G02B 27/0025; G02B 15/163; G02B 27/005; G02B 27/0068
See application file for complete search history.

(56) References Cited

U.S. PATENT DOCUMENTS

| | | | |
|---|---|---|---|
| 5,959,772 A | 9/1999 | Yonezawa | |
| 7,349,162 B2 * | 3/2008 | Fahlbusch | G02B 21/33 |
| | | | 359/380 |
| 8,988,780 B2 | 3/2015 | Matthae et al. | |
| 2003/0081530 A1 * | 5/2003 | Sato | G11B 7/1378 |
| 2009/0027769 A1 | 1/2009 | Saito et al. | |
| 2010/0142037 A1 | 6/2010 | Nakaywama | |
| 2015/0146304 A1 | 5/2015 | Yamawaki | |

FOREIGN PATENT DOCUMENTS

| | | | | |
|---|---|---|---|---|
| DE | 102004051357 | | 4/2006 | |
| DE | 102011116757 | | 4/2013 | |
| DE | 102014118383 A1 * | 6/2016 | | G02B 13/20 |
| JP | 2005-352021 | | 12/2005 | |

OTHER PUBLICATIONS

German Search Report, with translation thereof, for corresponding DE application No. 10 2019 204 285.6 dated Nov. 27, 2019.

* cited by examiner

*Primary Examiner* — Mustak Choudhury
(74) *Attorney, Agent, or Firm* — Fish & Richardson P.C.

(57) ABSTRACT

An objective for a microscope includes a displaceable lens group for correcting a spherical aberration. The displaceable lens group is designed in so that an offset of same in the direction perpendicular to the optical axis leads to only a small coma.

20 Claims, 7 Drawing Sheets

OBJECTIVE FOR A MICROSCOPE

CROSS-REFERENCE TO RELATED APPLICATION

This application claims priority under 35 U.S.C. § 119 to German patent application serial number DE 10 2019 204 285.6, filed Mar. 27, 2019. The entire contents of this application are incorporated herein by reference.

FIELD

The disclosure relates to an objective for a microscope. Moreover, the disclosure relates to a microscope having a corresponding objective.

BACKGROUND

Microscope objectives, in which the arrangement of the lenses is adjustable for the purposes of correcting a spherical aberration, are known. Such objectives with an adjustable lens group are known from DE 10 2004 051 357 A1, US 2009/0027769 A1, JP 2005-352021 and US 2015/0146304 A1, for example.

The displaceability of lenses in the objective for the purposes of correcting a spherical aberration may lead to other impairments of the imaging quality.

SUMMARY

The disclosure seeks to provide an objective with a lens group that is displaceable along the optical axis in such a way that the imaging quality of the objective is impaired as little as possible as a result of the displaceability of the lens group. In particular, the disclosure seeks to provide an objective with a correction group for correcting a spherical aberration in such a way that the possibility of correcting a spherical aberration leads to a coma that is as small as possible.

In one aspect, the disclosure provides an objective for a microscope. The objective includes a plurality of lenses disposed along an optical axis. At least one lens group is displaceable along the optical axis. The at least one displaceable lens group has a focal length. An object produces a first paraxial intermediate image in a half-space upstream of the displaceable lens group and a second paraxial intermediate image in a half-space downstream of the displaceable lens group. The following condition is satisfied for at least one beam ray imaging a point on the optical axis from the first paraxial intermediate image into the second paraxial intermediate image:

$$\frac{\sin\sigma}{\sin\sigma'} \times \frac{s'p}{s'p - \Delta s'} - \frac{\beta''}{\beta'} = 0$$

σ denotes an angle of inclination of the beam ray imaging the first paraxial intermediate image into the second paraxial intermediate image, upstream of the displaceable lens group. σ' denotes an angle of inclination of the beam ray imaging the first paraxial intermediate image into the second paraxial intermediate image, downstream of the displaceable lens group. s'p denotes the distance between the second paraxial intermediate image and the intermediate image of the entrance pupil, lying at infinity, in the half-space downstream of the displaceable lens group. Δs' denotes a longitudinal aberration of the beam ray with respect to the second paraxial intermediate image. β' denotes a paraxial magnification of the object imaged into the first paraxial intermediate image. β" denotes a paraxial magnification of the object imaged into the second paraxial intermediate image. The longitudinal aberration Δs' for at least one beam ray imaging a point on the optical axis in the first paraxial intermediate image into the second paraxial intermediate image is greater than or equal to 0.3 times the focal length of the at least one displaceable lens group.

According to the disclosure, the objective was identified as having a stable high imaging quality provided the following relationship is satisfied for at least one beam ray imaging an axis point of a paraxial image in the space upstream of the displaceable lens group into a paraxial image in the space downstream of the displaceable lens group:

$$\frac{\sin\sigma}{\sin\sigma'} \times \frac{s'p}{s'p - \Delta s'} - \frac{\beta''}{\beta'} = 0 \tag{1}$$

and the following applies to at least one beam ray:

$$\Delta s' \geq 0.3 f' \tag{2}$$

where:
- σ denotes an angle of inclination of the beam ray imaging the first paraxial intermediate image y' into the second paraxial intermediate image y", upstream of the displaceable lens group;
- σ' denotes an angle of inclination of the beam ray imaging the first paraxial intermediate image y' into the second paraxial intermediate image y", downstream of the displaceable lens group;
- s'p denotes the distance between the second paraxial intermediate image y" and the intermediate image of the entrance pupil, lying at infinity, in the half-space downstream of the displaceable lens group;
- Δs' denotes a longitudinal aberration of the beam ray with respect to the second paraxial intermediate image y";
- β' denotes a paraxial magnification of the object y imaged into the first paraxial intermediate image y'; and
- β" denotes a paraxial magnification of the object y imaged into the second paraxial intermediate image y".

A beam ray imaging from y' to y" denotes a ray of the beam emanating from y' to the displaceable lens group or a beam ray imaging from y' to y" that extends to y" from the displaceable lens group.

According to the disclosure, it was recognized that the conditions in the object space cannot be ignored when observing microscopic objects under the demands of high resolution. For correcting a spherical aberration, in particular, it is desirable to take account of, where used, the optical data of an immersion liquid, in particular the refractive index and thickness thereof, and, where used, the refractive index and thickness of cover slips. The samples themselves and the embedding thereof are constituent parts of the optical imaging chain.

A deviation of one or more of the specified parameters from their expected value can lead to a great deterioration in the imaging quality, in particular to spherical aberration. In order to offset, i.e., compensate, this, the objective includes a lens group that is displaceable along the optical axis, the latter likewise producing spherical aberration during the displacement thereof along the optical axis. The displaceable lens group is preferably designed in such a way that the same spherical aberration as in the object space, albeit with the opposite sign, arises as a result of this displacement of the lens group along the optical axis.

Further, it was recognized that, as a rule, the displaceability of the lens group along the optical axis leads to the displaceable lens group having a certain amount of play in the direction perpendicular to the optical axis. This may lead to a random, not completely controllable movement of the lens group in the direction perpendicular to the optical axis. A corresponding offset may lead to a coma arising.

According to the disclosure, it was further recognized that an offset of the displaceable lens group in the direction perpendicular to the optical axis only produces a small coma provided that the two aforementioned conditions are satisfied.

The displaceable lens group is also referred to as a correction group or as a corr-mechanism. In particular, it can be displaced, more particularly shifted, along the optical axis as a whole, i.e., as an otherwise rigid unit. With respect to details about a corresponding correction group, reference is made to, e.g., DE 10 2011 116 757 A1.

According to one aspect of the disclosure, the displaceable lens group is designed in such a way that a spherical aberration producible by the displacement of the lens group along the optical axis corresponds in terms of absolute value precisely to a predetermined spherical aberration produced in the object space, albeit with the opposite sign.

What this can achieve is that the spherical aberration caused by the conditions in the object space is able to be largely, more particularly completely, compensated. The spherical aberration caused by the conditions in the object space can be corrected, in particular, by displacing the displaceable lens group.

According to a further aspect of the disclosure, the displaceable lens group has a play in the direction perpendicular to the optical axis of no more than 10 micrometres during the displacement along the optical axis. Preferably, the play of the displaceable lens group in the direction perpendicular to the optical axis is no more than 5 micrometres.

Little play of the displaceable lens group in the direction perpendicular to the optical axis reduces the risk of an unwanted coma.

Greater play simplifies the structural design of the displacement mechanism.

According to a further aspect of the disclosure, the displaceable lens group includes two triple cemented members.

The triple cemented members are also referred to as lens triplets.

The triple cemented members can include lenses made of two or three different materials.

The first triple cemented member can preferably include a biconcave lens and, adjoining the latter, two biconvex lenses.

The second triple cemented member includes, in particular, a biconvex lens and, adjoining the latter, a meniscus lens and a biconcave lens.

According to a further aspect of the disclosure, the displaceable lens group includes at least one triple cemented member and a single lens, wherein the single lens is made of the same material as the central lens of the at least one triple cemented member.

The material of these two lenses preferably has a refractive index that is smaller than that of the materials of the remaining lenses of the displaceable lens group. According to a further aspect of the disclosure, the displaceable lens group includes a first triple cemented member, a second triple cemented member and a single lens in the direction of the beam path, wherein the second triple cemented member is embodied in such a way that the beam emanating from the object to be observed has a waist in the region of the second triple cemented member when passing through the objective. In particular, the beam has a waist in the region of the central lens of the second triple cemented member.

According to a further aspect of the disclosure, the objective has a numerical aperture of at least 0.8, in particular 0.9, in particular at least 1.0, in particular at least 1.1, in particular at least 1.2. In particular, the numerical aperture of the objective can be 1.2. In particular, these specifications relate to the use of water as an immersion medium.

Such a high numerical aperture leads to a high resolution of the objective. Therefore, the objective is also referred to as a high-resolution or high-power objective.

According to a further aspect of the disclosure, the objective has a magnification of at least 20, in particular at least 25, in particular at least 40. In particular, the magnification of the objective can be 40.

According to a further aspect of the disclosure, the objective includes lenses made of at least four, in particular at least five, in particular at least six, in particular at least seven, in particular at least eight, in particular at least nine glasses with different refractive indices. As a result, an apochromatism can be obtained in the spectral range from 380 nm to 900 nm. Consequently, the objective is, in particular, a broadband, apochromatic objective.

According to a further aspect of the disclosure, the objective is an immersion objective, in particular a water immersion objective.

The disclosure also seeks to provide an improved a microscope, in particular a microscope for light microscopy, in particular for wide field light microscopy.

The disclosure provides a microscope with an objective according to the descriptions above.

BRIEF DESCRIPTION OF THE FIGURES

Further details and advantages of the disclosure will become apparent from the description of exemplary embodiments with reference to the figures, in which.

DESCRIPTION OF EXEMPLARY EMBODIMENTS

For the purposes of describing the disclosure, paraxial imaging of an object y into a first paraxial intermediate image y' in the half-space upstream of the correction group 2 and imaging the object y into a second paraxial intermediate image y" in the half-space downstream of the correction group 2 and imaging the first intermediate image y' into the second intermediate image y" are explained first. Here, an aberration-free intermediate image y' is assumed.

Figure 1:
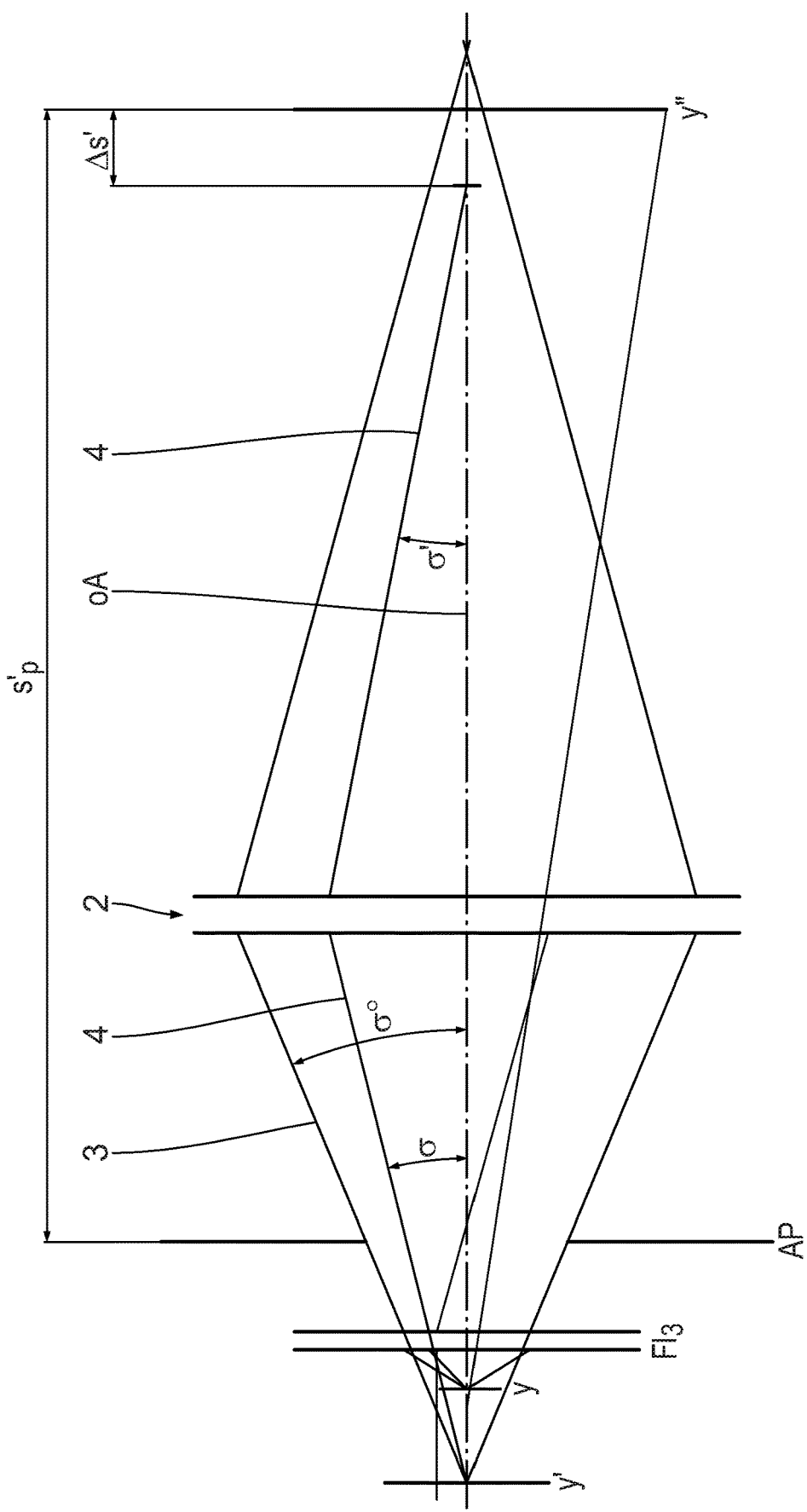
FIG. 1 shows, schematically and in simplified form, the profile of a few beam rays for paraxial imaging of an object y into an intermediate image y' upstream of the correction group and for imaging the intermediate image y' into an intermediate image y" in the space downstream of the correction group, for the purposes of explaining the disclosure.

Moreover, the position of the image AP of the entrance pupil, lying at infinity, is illustrated in FIG. 1.

Moreover, FIG. 1 illustrates the position of the front side $Fl_3$ the front-most lens $L_1$ of the objective 1. In particular, the two principal planes of the front objective part are illustrated schematically in FIG. 1.

Further, the following labels are used in FIG. 1:
oA: Optical axis of the objective 1;
σ°: Angle of inclination of a marginal ray 3 of the beam for imaging y' onto y", relative to the optical axis;
σ: Angle of inclination of a beam ray 4 of the beam for imaging y' onto y", relative to the optical axis in the space upstream of the correction group 2;
the following holding true: $0 \leq \sigma \leq \sigma°$;
σ': Angle of inclination of a beam ray 4 of the beam for imaging y' onto y", relative to the optical axis in the space downstream of the correction group 2;
Δs': Longitudinal aberration of the beam ray 4 in relation to the position of the second paraxial intermediate image y"; and
s'p: Distance between the second paraxial intermediate image y" and the position of the image AP of the entrance pupil.

Further, β' denotes the paraxial magnification when imaging the object y into the half-space upstream of the correction group 2, and β" denotes the paraxial magnification when imaging the object y into the half-space downstream of the correction group 2.

F' denotes the focal length of the correction group 2.
A dimensionless parameter $$A = \frac{\sin\sigma}{\sin\sigma'} \times \frac{s'_p}{s'_p - \Delta s'} - \frac{\beta''}{\beta'}$$

can be defined from the quantities listed above.

For the objective 1, still to be described in more detail below, the following applies to at least one beam ray 4, i.e., to at least one value of σ between 0 and σ°: A=0 and, for at least one beam ray 4: $\Delta s' \geq 0.3$ F'. Here, the two conditions need not necessarily relate to the same beam ray.

Figure 2:
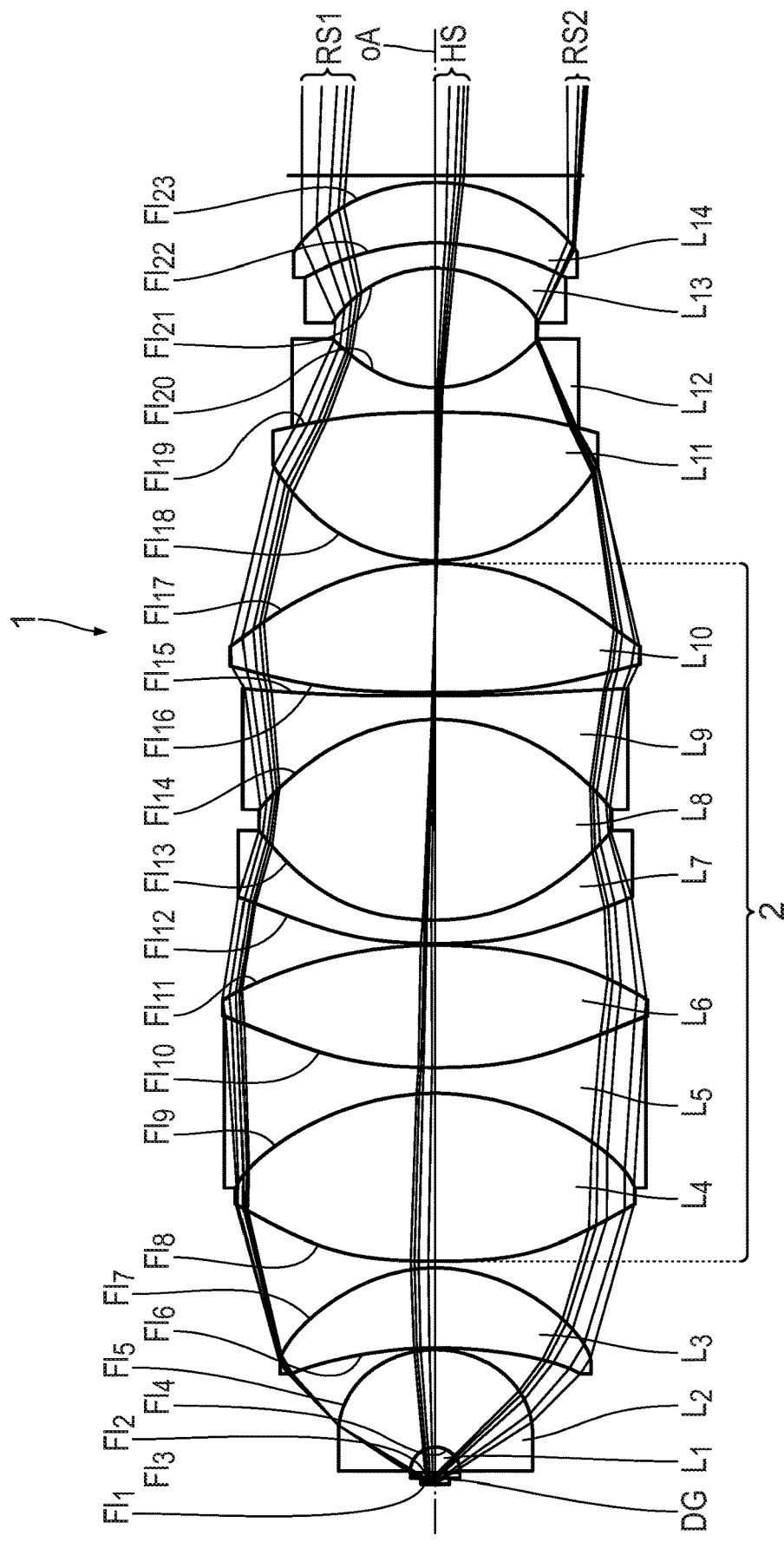
FIG. 2 shows a schematic longitudinal section through the optical components of an objective according to a first variant.
Figure 3:
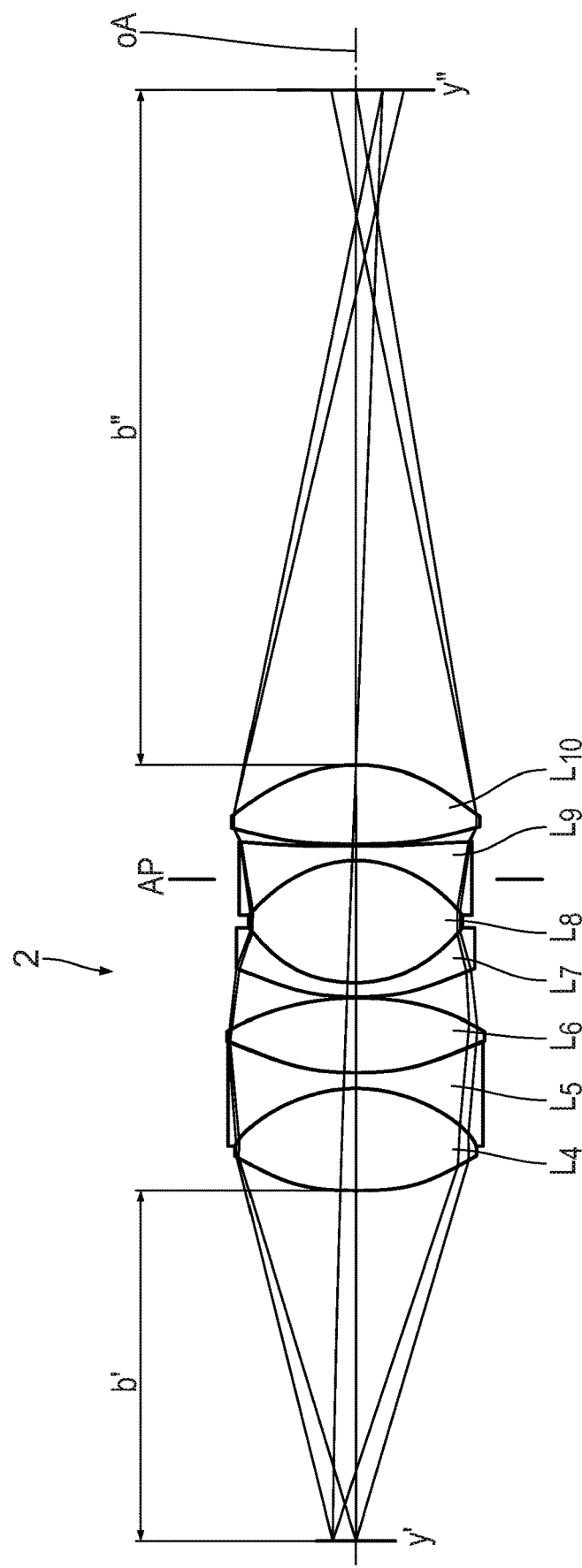
FIG. 3 schematically shows the beam path for imaging the paraxial intermediate image y' in the space upstream of the correction group into the paraxial intermediate image y" in the space downstream of the correction group, for the correction group of the objective according to FIG. 2.

A first variant of the objective 1 is described in detail below, with reference being made to FIGS. 2 and 3.

To provide a better overview, mechanical constituent parts of the objective 1 are not illustrated in the figures.

The figure illustrates the profiles of chief rays HS and marginal rays RS1, RS2 at different wavelengths for an object point lying slightly off axis.

Moreover, a cover slip DG is illustrated in the figure.

In particular, the objective 1 is an immersion objective. In particular, this is an apochromatic objective.

The objective 1 includes 14 lenses $L_1$ to $L_{14}$.

The lenses $L_4$ to $L_{10}$ form the correction group 2. In particular, they are displaceable in the direction of the optical axis oA.

The front-most lens $L_1$ has a planar front side $Fl_3$. In particular, it can be manufactured from a material that has a refractive index ne in the range of 1.3 to 1.6 at a wavelength of e=546 nm. In particular, it can be manufactured from a glass with a refractive index ne of 1.46008.

Two double cemented members are disposed in the beam path downstream of the correction group 2.

The correction group 2 includes seven lenses $L_4$ to $L_{10}$.

In particular, the lenses $L_4$ to $L_6$ of the correction group 2 form a first triple cemented member. The lens $L_4$ has a biconvex embodiment. The lens $L_5$ has a biconcave embodiment. The lens $L_6$ has a biconvex embodiment. In particular, the lens $L_6$ has a mirror-symmetric embodiment. In terms of absolute value, its front side $Fl_{10}$ and its back side $Fl_{11}$ have the same radius of curvature.

The lenses $L_7$ to $L_9$ form a second triple cemented member. The lens $L_7$ is embodied as a meniscus lens. The lens $L_8$ has a biconvex embodiment. The lens $L_8$ has a symmetric embodiment. In terms of absolute value, its front side $Fl_{13}$ and its back side $Fl_{14}$ have the same radius of curvature.

The beam path in the objective 1 has a waist in the region of the second triple cemented member, in particular in the region of the lens $L_8$.

The lens $L_9$ has a biconcave embodiment.
The single lens $L_{10}$ has a biconvex embodiment.
The lenses $L_8$ and $L_{10}$ are manufactured from the same glass.
The lenses $L_7$ and $L_9$ are manufactured from the same glass.

The design data of the objective 1 according to FIG. 2 are once again listed in detail in Table 1.

TABLE 1

| | Area FL | Radius of curvature r [mm] | Thickness d [mm] | Refractive index $n_e$ | Abbe number $v_e$ |
|---|---|---|---|---|---|
| DG | 1 | Infinite | Variable | 1.52559 | 54.30 |
| | 2 | Infinite | Variable | 1.33419 | 55.88 |
| $L_1$ | 3 | Infinite | 0.820 | 1.46008 | 67.68 |
| $L_2$ | 4 | −0.918 | 3.710 | 1.88815 | 40.52 |
| | 5 | −3.760 | 0.060 | | |
| $L_3$ | 6 | −15.910 | 3.000 | 1.59446 | 98.02 |
| | 7 | −6.633 | Variable | | |
| $L_4$ | 8 | 14.453 | 6.200 | 1.51976 | 52.14 |
| $L_5$ | 9 | −9.716 | 0.950 | 1.64132 | 42.20 |
| $L_6$ | 10 | 16.549 | 4.500 | 1.53019 | 76.58 |
| | 11 | −16.549 | 0.060 | | |
| $L_7$ | 12 | 15.645 | 0.900 | 1.75844 | 52.08 |
| $L_8$ | 13 | 8.004 | 7.400 | 1.43985 | 94.49 |
| $L_9$ | 14 | −8.004 | 0.900 | 1.75844 | 52.08 |
| | 15 | 93.058 | 0.170 | | |
| $L_{10}$ | 16 | 29.639 | 4.750 | 1.43985 | 94.49 |
| | 17 | −10.903 | Variable | | |
| $L_{11}$ | 18 | 6.774 | 5.529 | 1.43985 | 94.49 |
| $L_{12}$ | 19 | −23.884 | 0.900 | 1.64132 | 42.20 |
| | 20 | 4.940 | 4.510 | | |
| $L_{13}$ | 21 | −4.371 | 0.800 | 1.59446 | 68.02 |
| $L_{14}$ | 22 | −10.071 | 2.280 | 1.72539 | 34.47 |
| | 23 | 6.400 | 0.287 | | |
| | 24 | Infinite | | | |

In conjunction with the tube lens described below in Table 2, the objective 1 has a 40× magnification. The objective 1 has a numerical aperture of 1.2. The objective 1 has an object field size of 0.625 mm. The objective 1 has a focal length of 4.12 mm. The objective 1 has a distance from the first tube lens of 126.50 mm.

A selection of the details for designing the tube lens unit provided for the objective 1 are summarized in Table 2 below.

TABLE 2

| Surface No. | Radius of curvature r [mm] | Thickness d [mm] | Refractive index $n_e$ | Abbe number $v_e$ |
|---|---|---|---|---|
| 1 | 189.417 | 10.900 | 1.58212 | 53.59 |
| 2 | −189.417 | 60.000 | | |
| 7 | Infinite | 80.000 | 1.51872 | 63.96 |
| 8 | Infinite | 48.200 | | |
| 9 | Intermediate image plane | | | |

The tube lens unit has a focal length of 164.5 mm.

Table 3 specifies displacement data for the correction group 2 when using cover slips with different thicknesses.

TABLE 3

| Variant | Thin cover slip | Normal cover slip | Thick cover slip |
|---|---|---|---|
| Thickness 1 (DG) [mm] | 0.130 | 0.170 | 0.200 |
| Thickness 2 (Distance) [mm] | 0.311 | 0.281 | 0.259 |
| Thickness 7 [mm] | 0.347 | 0.253 | 0.173 |
| Thickness 17 [mm] | 0.036 | 0.130 | 0.210 |

The lenses $L_1$ to $L_3$ and $L_{11}$ to $L_{14}$ remain stationary relative to one another when the correction group 2 is displaced. The sum of the distances $d_7$ and $d_{17}$ is constant.

When use is made of a cover slip with a thickness of 0.170 mm, the magnification β' when imaging the object y into the first paraxial intermediate image y' is 4.177. With the further values specified in Table 3, the distance b' from the first paraxial intermediate image y' to the correction group 2, in particular to the front side $Fl_8$ of the lens $L_4$, is −21.058 mm.

The magnification β" when imaging the object y into the second paraxial intermediate image y" in the half-space downstream of the correction group 2 is −7.273. The distance between the second paraxial intermediate image y" and the correction group 2, in particular the back side $Fl_{17}$ of the lens $L_{10}$, is 40.887 mm.

The distance between the image AP of the entrance pupil and the second paraxial intermediate image y" is −47.774 mm.

Figure 4:
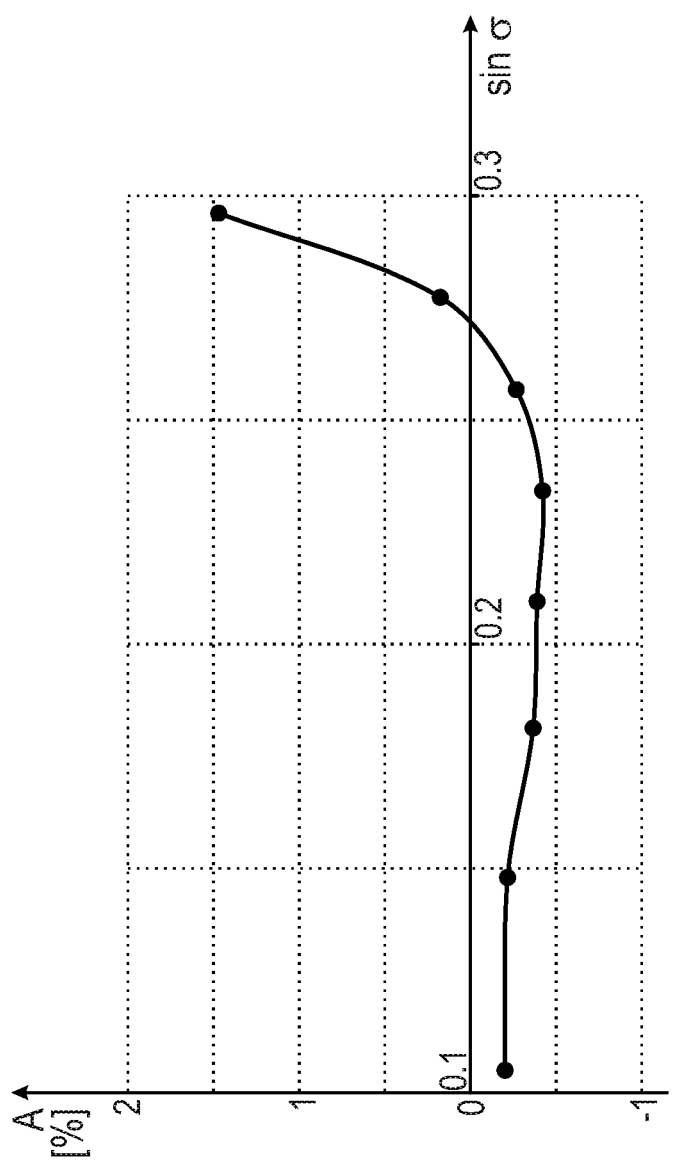
FIG. 4 shows the dependence of the parameter A, defined above, on the sine of the inclination of the beam ray for imaging y' into y" in the objective according to FIG. 2.

FIG. 4 illustrates the dependence of the parameter A on the sine of the ray inclination of a beam ray for imaging y' onto y". The curve has a zero at σ≈16°.

The longitudinal aberration Δs' of the marginal ray 3 is 7.66 mm. The focal length f' of the correction group 2 of the objective 1 is 19.87 mm. Hence, Δs'>0.3 f' applies.

In-depth analysis has shown that the correction group 2 is in fact insensitive to an offset in the direction perpendicular to the optical axis.

Figure 5:
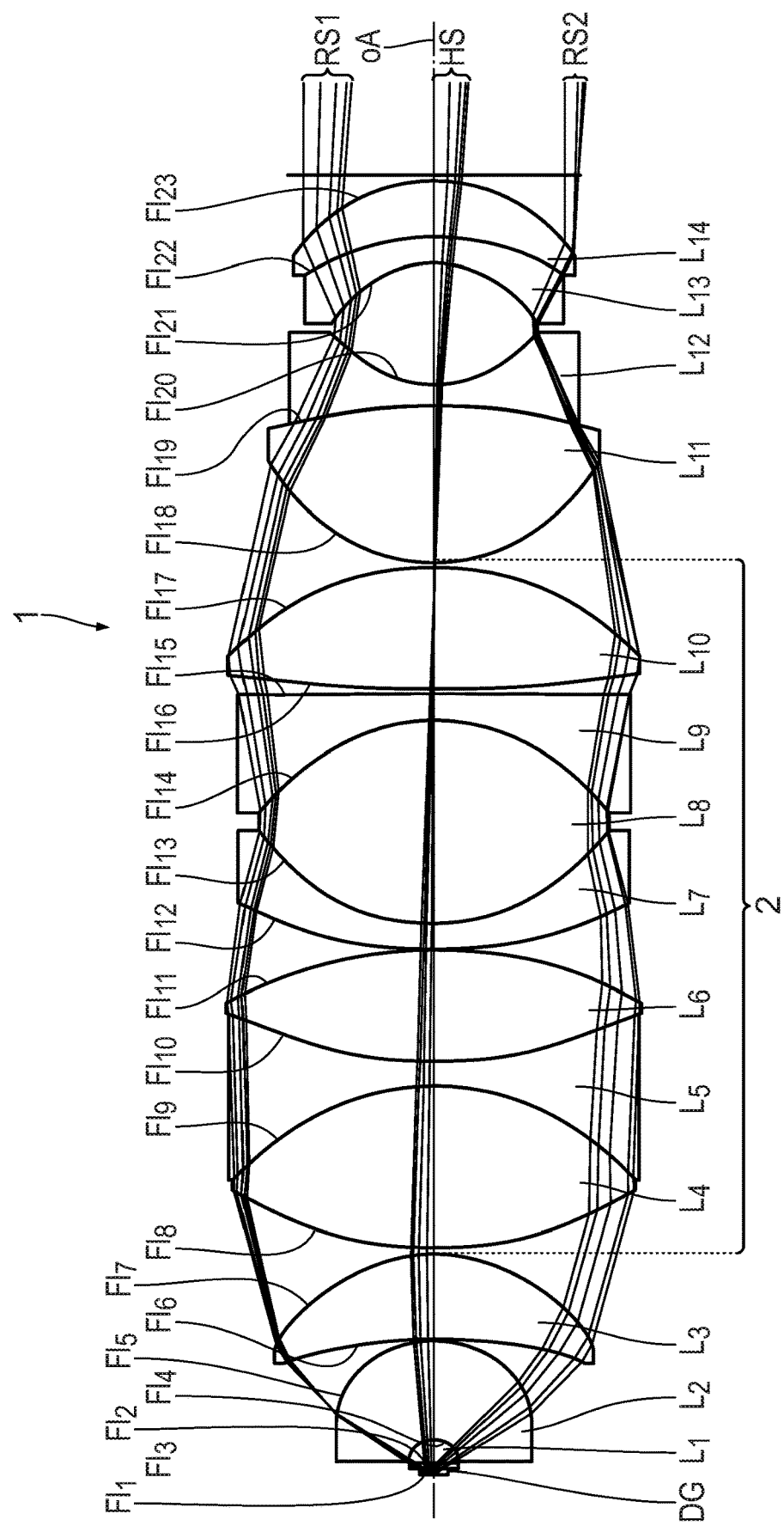
FIG. 5 shows a schematic longitudinal section through the optical components of an objective according to a first variant.
Figure 6:
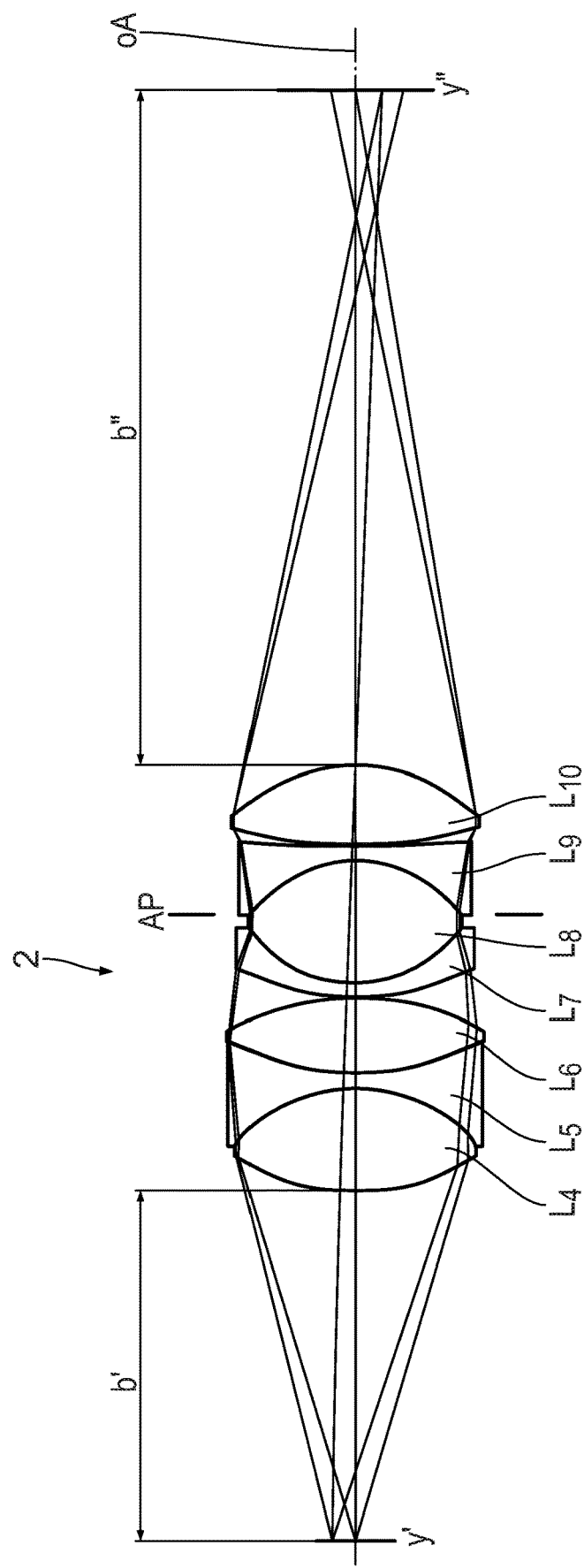
FIG. 6 schematically shows the beam path for imaging the paraxial intermediate image y' in the space upstream of the correction group into the paraxial intermediate image y" in the space downstream of the correction group, for the correction group of the objective according to FIG. 5.
Figure 7:
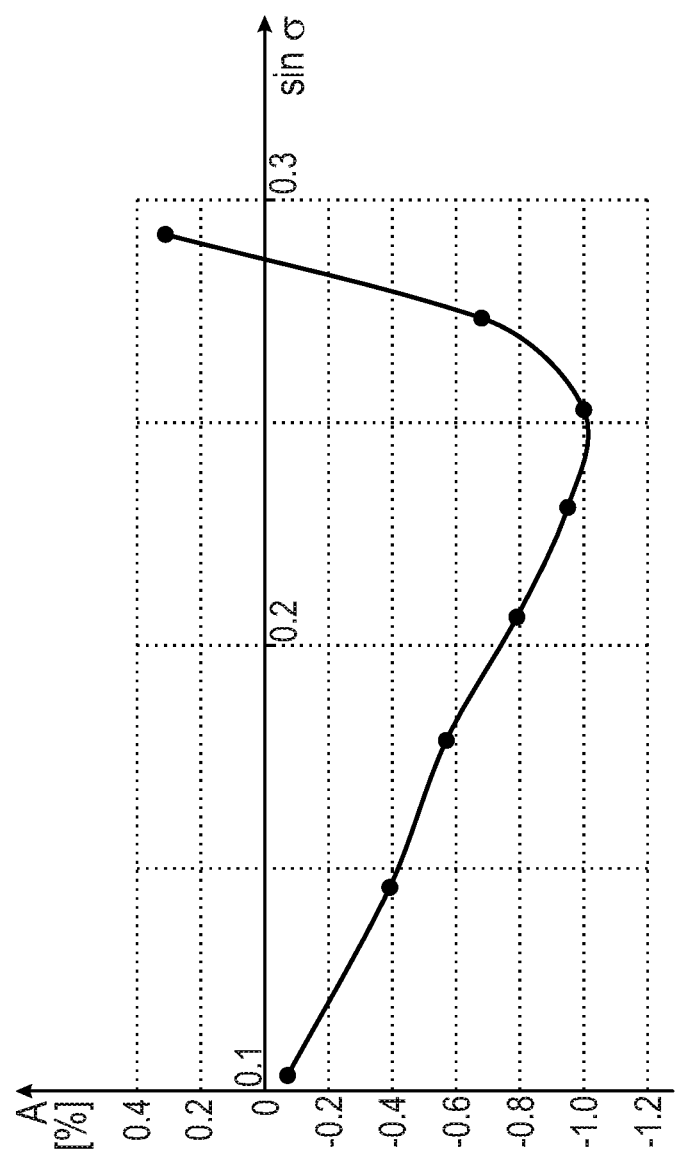
FIG. 7 shows the dependence of the parameter A, defined above, on the sine of the inclination of the beam ray for imaging y' into y" in the objective according to FIG. 5.

A further variant of the objective 1 is described below, with reference being made to FIGS. 5 and 6.

To provide a better overview, mechanical constituent parts of the objective 1 are not illustrated in the figures. With respect to general details, reference is made to the description of the objective according to FIGS. 2 and 3.

The objective 1 includes 14 lenses $L_1$ to $L_{14}$.

The lenses $L_4$ to $L_{10}$ form the correction group 2. In particular, they are displaceable in the direction of the optical axis oA.

The front-most lens $L_1$ has a planar front side $Fl_3$. In particular, it can be manufactured from a material that has a refractive index ne in the range of 1.3 to 1.6 at a wavelength of e=546 nm. In particular, it can be manufactured from a glass with a refractive index ne of 1.46008.

Two double cemented members are disposed in the beam path downstream of the correction group 2.

The correction group 2 includes seven lenses $L_4$ to $L_{10}$.

In particular, the lenses $L_4$ to $L_6$ of the correction group 2 form a first triple cemented member. The lens $L_4$ has a biconvex embodiment. The lens $L_5$ has a biconcave embodiment. The lens $L_6$ has a biconvex embodiment. The absolute values of the radii of curvature of its front side $Fl_{10}$ and its back side $Fl_{11}$ deviate from one another by less than 10%.

The lenses $L_7$ to $L_9$ form a second triple cemented member. The lens $L_7$ is embodied as a meniscus lens. The lens $L_8$ has a biconvex embodiment. The absolute values of the radii of curvature of its front side $Fl_{13}$ and its back side $Fl_{14}$ deviate from one another by less than 10%, in particular by less than 5%, in particular by less than 3%, in particular by less than 2%.

The beam path in the objective 1 has a waist in the region of the second triple cemented member, in particular in the region of the lens $L_8$.

The lens $L_9$ has a biconcave embodiment.

The single lens $L_{10}$ has a biconvex embodiment.

The lenses $L_8$ and $L_{10}$ are manufactured from the same glass.

The design data of the objective 1 according to FIG. 5 are once again listed in detail in Table 4.

TABLE 4

| Area FL | | Radius of curvature r [mm] | Thickness d [mm] | Refractive index $n_e$ | Abbe number $v_e$ |
|---|---|---|---|---|---|
| DG | 1 | Infinite | Variable | 1.52559 | 54.30 |
| | 2 | Infinite | Variable | 1.33419 | 55.88 |
| $L_1$ | 3 | Infinite | 0.820 | 1.46008 | 67.68 |
| $L_2$ | 4 | −0.918 | 3.7350 | 1.88815 | 40.52 |
| | 5 | −3.760 | 0.060 | | |
| $L_3$ | 6 | −18.040 | 3.154 | 1.59446 | 68.02 |
| | 7 | −6.876 | Variable | | |
| $L_4$ | 8 | 14.277 | 6.000 | 1.51976 | 52.14 |
| $L_5$ | 9 | −9.858 | 0.950 | 1.64132 | 42.20 |
| $L_6$ | 10 | 17.277 | 4.150 | 1.58794 | 84.07 |
| | 11 | −16.078 | 0.060 | | |
| $L_7$ | 12 | 16.908 | 0.950 | 1.75844 | 52.08 |
| $L_8$ | 13 | 7.885 | 7.650 | 1.43985 | 94.49 |
| $L_9$ | 14 | −7.717 | 0.950 | 1.73234 | 54.45 |
| | 15 | −865.320 | 0.159 | | |
| $L_{10}$ | 16 | 51.212 | 4.554 | 1.43985 | 94.49 |
| | 17 | −10.592 | Variable | | |
| $L_{11}$ | 18 | 6.895 | 5.869 | 1.43985 | 94.49 |
| $L_{12}$ | 19 | −22.548 | 0.900 | 1.64132 | 42.20 |
| | 20 | 4.940 | 4.4036 | | |
| $L_{13}$ | 21 | −4.371 | 1.000 | 1.59446 | 68.02 |
| $L_{14}$ | 22 | −9.039 | 2.070 | 1.72539 | 34.47 |
| | 23 | −6.312 | 0.220 | | |
| | 24 | Infinite | | | |

In conjunction with the tube lens described below in Table 5, the objective 1 has a 40× magnification. The objective 1 has a numerical aperture of 1.2. The objective 1 has an object field size of 0.625 mm. The objective 1 has a focal length of 4.12 mm. The objective 1 has a distance from the first tube lens of 126.50 mm.

A selection of the details for designing the tube lens unit provided for the objective 1 are summarized in Table 5 below.

TABLE 5

| Surface No. | Radius of curvature r [mm] | Thickness d [mm] | Refractive index $n_e$ | Abbe number $v_e$ |
|---|---|---|---|---|
|  |  | 114.400 |  |  |
| 1 | 189.417 | 10.900 | 1.58212 | 53.59 |
| 2 | −189.417 | 60.000 |  |  |
| 7 | Infinite | 80.000 | 1.51872 | 63.96 |
| 8 | Infinite | 48.200 |  |  |
| 9 | Intermediate image plane |  |  |  |

The tube lens unit has a focal length of 164.5 mm.

Table 6 specifies displacement data for the correction group 2 when using cover slips with different thicknesses.

TABLE 6

| Variant | Thin cover slip | Normal cover slip | Thick cover slip |
|---|---|---|---|
| Thickness 1 (DG) [mm] | 0.140 | 0.170 | 0.190 |
| Thickness 2 (Distance) [mm] | 0.303 | 0.281 | 0.266 |
| Thickness 7 [mm] | 0.316 | 0.239 | 0.181 |
| Thickness 17 [mm] | 0.106 | 0.183 | 0.241 |

The lenses $L_1$ to $L_3$ and $L_{11}$ to $L_{14}$ remain stationary relative to one another when the correction group 2 is displaced. The sum of the distances $d_7$ and $d_{17}$ is constant.

When use is made of a cover slip with a thickness of 0.170 mm, the magnification β' when imaging the object y into the first paraxial intermediate image y' is 4.325. With the further values specified in Table 6, the distance b' from the first paraxial intermediate image y' to the correction group 2, in particular to the front side $Fl_8$ of the lens $L_4$, is −21.974 mm.

The magnification β" when imaging the object y into the second paraxial intermediate image y" in the half-space downstream of the correction group 2 is −7.257. The distance between the second paraxial intermediate image y" and the correction group 2, in particular the back side $Fl_{17}$ of the lens $L_{10}$, is 42.001 mm.

The distance between the image AP of the entrance pupil and the second paraxial intermediate image y" is −51.100 mm.

What is claimed is:

1. An objective, comprising:
a plurality of lenses disposed along an optical axis, wherein:
the plurality of lenses comprises a lens group that is displaceable along the optical axis;
the displaceable lens group has a focal length;
the objective is configured so that, during use of the objective, an object produces a first paraxial intermediate image in a half-space upstream of the displaceable lens group and a second paraxial intermediate image in a half-space downstream of the displaceable lens group;
the following condition is satisfied for at least one beam ray imaging a point on the optical axis from the first paraxial intermediate image into the second paraxial intermediate image:

$$\frac{\sin\sigma}{\sin\sigma'} \times \frac{s'p}{s'p - \Delta s'} - \frac{\beta''}{\beta'} = 0;$$

σ denotes an angle of inclination of the beam ray imaging the first paraxial intermediate image into the second paraxial intermediate image, upstream of the displaceable lens group;

σ' denotes an angle of inclination of the beam ray imaging the first paraxial intermediate image into the second paraxial intermediate image, downstream of the displaceable lens group;

s'p denotes the distance between the second paraxial intermediate image and the intermediate image of the entrance pupil, lying at infinity, in the half-space downstream of the displaceable lens group;

Δs' denotes a longitudinal aberration of the beam ray with respect to the second paraxial intermediate image;

β' denotes a paraxial magnification of the object imaged into the first paraxial intermediate image;

β" denotes a paraxial magnification of the object imaged into the second paraxial intermediate image; and for at least one beam ray imaging a point on the optical axis in the first paraxial intermediate image into the second paraxial intermediate image, the longitudinal aberration Δs' is greater than or equal to 0.3 times the focal length of the displaceable lens group.

2. The objective of claim 1, wherein the displaceable lens group is configured so that, during use of the objective, a spherical aberration produced by displacing of the displaceable lens group along the optical axis has an absolute value that is identical to a predetermined spherical aberration produced in an object space.

3. The objective of claim 2, wherein a sign of the spherical aberration produced by displacing the displaceable lens group along the optical axis is opposite a sign of the predetermined spherical aberration produced in the object space.

4. The objective of claim 1, wherein the objective is configured so that, during displacement of the lens group along the optical axis, the lens group has a play of no more than 10 micrometers in a direction perpendicular to the optical axis.

5. The objective of claim 1, wherein the displaceable lens group comprises two triple cemented members.

6. The objective of claim 1, wherein the displaceable lens group comprises a triple cemented member and a single lens.

7. The objective of claim 6, wherein:
the triple cemented member comprises a central lens; and
the single lens and the central lens comprise the same material.

8. The objective of claim 7, wherein:
the objective is configured so that, during displacement of the lens group along the optical axis, the lens group has a play of no more than 10 µm in a direction perpendicular to the optical axis; and
the displaceable lens group comprises a triple cemented member and a single lens.

9. The objective of claim 1, wherein the displaceable lens group comprises a first triple cemented member, a second triple cemented member, and a single lens along a direction of the beam path.

10. The objective of claim 9, wherein the second triple cemented member is configured so that, during use of the objective, a beam emanating from the object has a waist in a region of the second triple cemented member.

11. The objective of claim 1, wherein the objective has a numerical aperture of at least 0.8.

12. The objective of claim 1, wherein the objective has a magnification of at least 25.

13. The objective of claim 1, wherein displaceable lens group comprises seven lenses ($L_4$ to $L_{10}$) with the following optical design data:

|  | Area FL | Radius of curvature r [mm] | Thickness d [mm] | Refractive index $n_e$ | Abbe number $v_e$ |
|---|---|---|---|---|---|
| $L_4$ | 8 | 14.453 | 6.200 | 1.51976 | 52.14 |
| $L_5$ | 9 | −9.716 | 0.950 | 1.64132 | 42.20 |
| $L_6$ | 10 | 16.549 | 4.500 | 1.53019 | 76.58 |
|  | 11 | −16.549 | 0.060 |  |  |
| $L_7$ | 12 | 15.645 | 0.900 | 1.75844 | 52.08 |
| $L_8$ | 13 | 8.004 | 7.400 | 1.43985 | 94.49 |
| $L_9$ | 14 | −8.004 | 0.900 | 1.75844 | 52.08 |
|  | 15 | 93.058 | 0.170 |  |  |
| $L_{10}$ | 16 | 29.639 | 4.750 | 1.43985 | 94.49 |

14. The objective of claim 1, wherein the objective has the following design data:

|  | Area FL | Radius of curvature r [mm] | Thickness d [mm] | Refractive index $n_e$ | Abbe number $v_e$ |
|---|---|---|---|---|---|
| DG | 1 | Infinite | Variable | 1.52559 | 54.30 |
|  | 2 | Infinite | Variable | 1.33419 | 55.88 |
| $L_1$ | 3 | Infinite | 0.820 | 1.46008 | 67.68 |
| $L_2$ | 4 | −0.918 | 3.710 | 1.88815 | 40.52 |
|  | 5 | −3.760 | 0.060 |  |  |
| $L_3$ | 6 | −15.910 | 3.000 | 1.59446 | 98.02 |
|  | 7 | −6.633 | Variable |  |  |
| $L_4$ | 8 | 14.453 | 6.200 | 1.51976 | 52.14 |
| $L_5$ | 9 | −9.716 | 0.950 | 1.64132 | 42.20 |
| $L_6$ | 10 | 16.549 | 4.500 | 1.53019 | 76.58 |
|  | 11 | −16.549 | 0.060 |  |  |
| $L_7$ | 12 | 15.645 | 0.900 | 1.75844 | 52.08 |
| $L_8$ | 13 | 8.004 | 7.400 | 1.43985 | 94.49 |
| $L_9$ | 14 | −8.004 | 0.900 | 1.75844 | 52.08 |
|  | 15 | 93.058 | 0.170 |  |  |
| $L_{10}$ | 16 | 29.639 | 4.750 | 1.43985 | 94.49 |
|  | 17 | −10.903 | Variable |  |  |
| $L_{11}$ | 18 | 6.774 | 5.529 | 1.43985 | 94.49 |
| $L_{12}$ | 19 | −23.884 | 0.900 | 1.64132 | 42.20 |
|  | 20 | 4.940 | 4.510 |  |  |
| $L_{13}$ | 21 | −4.371 | 0.800 | 1.59446 | 68.02 |
| $L_{14}$ | 22 | −10.071 | 2.280 | 1.72539 | 34.47 |
|  | 23 | 6.400 | 0.287 |  |  |
|  | 24 | Infinite |  |  |  |

15. The objective of claim 1, wherein the displaceable lens group comprises seven lenses ($L_4$ to $L_{10}$) with the following design data:

|  | Area FL | Radius of curvature r [mm] | Thickness d [mm] | Refractive index $n_e$ | Abbe number $v_e$ |
|---|---|---|---|---|---|
| $L_4$ | 8 | 14.277 | 6.000 | 1.51976 | 52.14 |
| $L_5$ | 9 | −9.858 | 0.950 | 1.64132 | 42.20 |
| $L_6$ | 10 | 17.277 | 4.150 | 1.58794 | 84.07 |
|  | 11 | −16.078 | 0.060 |  |  |
| $L_7$ | 12 | 16.908 | 0.950 | 1.75844 | 52.08 |
| $L_8$ | 13 | 7.885 | 7.650 | 1.43985 | 94.49 |
| $L_9$ | 14 | −7.717 | 0.950 | 1.73234 | 54.45 |
|  | 15 | −865.320 | 0.159 |  |  |
| $L_{10}$ | 16 | 51.212 | 4.554 | 1.43985 | 94.49 |

16. The objective of claim 1, wherein the objective has the following design data:

|  | Area FL | Radius of curvature r [mm] | Thickness d [mm] | Refractive index $n_e$ | Abbe number $v_e$ |
|---|---|---|---|---|---|
| DG | 1 | Infinite | Variable | 1.52559 | 54.30 |
|  | 2 | Infinite | Variable | 1.33419 | 55.88 |
| $L_1$ | 3 | Infinite | 0.820 | 1.46008 | 67.68 |
| $L_2$ | 4 | −0.918 | 3.7350 | 1.88815 | 40.52 |
|  | 5 | −3.760 | 0.060 |  |  |
| $L_3$ | 6 | −18.040 | 3.154 | 1.59446 | 68.02 |
|  | 7 | −6.876 | Variable |  |  |
| $L_4$ | 8 | 14.277 | 6.000 | 1.51976 | 52.14 |
| $L_5$ | 9 | −9.858 | 0.950 | 1.64132 | 42.20 |
| $L_6$ | 10 | 17.277 | 4.150 | 1.58794 | 84.07 |
|  | 11 | −16.078 | 0.060 |  |  |
| $L_7$ | 12 | 16.908 | 0.950 | 1.75844 | 52.08 |
| $L_8$ | 13 | 7.885 | 7.650 | 1.43985 | 94.49 |
| $L_9$ | 14 | −7.717 | 0.950 | 1.73234 | 54.45 |
|  | 15 | −865.320 | 0.159 |  |  |
| $L_{10}$ | 16 | 51.212 | 4.554 | 1.43985 | 94.49 |
|  | 17 | −10.592 | Variable |  |  |
| $L_{11}$ | 18 | 6.895 | 5.869 | 1.43985 | 94.49 |
| $L_{12}$ | 19 | −22.548 | 0.900 | 1.64132 | 42.20 |
|  | 20 | 4.940 | 4.4036 |  |  |
| $L_{13}$ | 21 | −4.371 | 1.000 | 1.59446 | 68.02 |
| $L_{14}$ | 22 | −9.039 | 2.070 | 1.72539 | 34.47 |
|  | 23 | −6.312 | 0.220 |  |  |
|  | 24 | Infinite |  |  |  |

17. The objective of claim 1, wherein:
the objective is configured so that, during displacement of the lens group along the optical axis, the lens group has a play of no more than 10 μm in a direction perpendicular to the optical axis; and
the displaceable lens group comprises two triple cemented members.

18. The objective of claim 1, wherein:
the displaceable lens group is configured so that, during use of the objective, a spherical aberration produced by displacing of the displaceable lens group along the optical axis has an absolute value that is identical to a predetermined spherical aberration produced in an object space; and
the objective has a numerical aperture of at least 0.8.

19. The objective of claim 1, wherein:
the displaceable lens group is configured so that, during use of the objective, a spherical aberration produced by displacing of the displaceable lens group along the optical axis has an absolute value that is identical to a predetermined spherical aberration produced in an object space; and
the objective has a magnification of at least 25.

20. A microscope, comprising:
an objective according to claim 1.

\* \* \* \* \*

UNITED STATES PATENT AND TRADEMARK OFFICE
CERTIFICATE OF CORRECTION

| | |
|---|---|
| PATENT NO. | : 11,520,131 B2 |
| APPLICATION NO. | : 16/829393 |
| DATED | : December 6, 2022 |
| INVENTOR(S) | : Rolf Wartmann |

It is certified that error appears in the above-identified patent and that said Letters Patent is hereby corrected as shown below:

In the Specification

Column 3, Line 17, delete "corr-mechanism." insert --core-mechanism.--.

Signed and Sealed this
Thirty-first Day of January, 2023

Katherine Kelly Vidal
*Director of the United States Patent and Trademark Office*